(12) United States Patent
Ghosh et al.

(10) Patent No.: US 9,532,221 B2
(45) Date of Patent: Dec. 27, 2016

(54) COMMUNICATING CREDENTIALS AND CONTENT BETWEEN MULTIPLE MOBILE ELECTRONIC DEVICES LOCATED WITHIN CONTENT SHARING GEOGRAPHICAL AREA

(71) Applicant: Motorola Mobility LLC, Chicago, IL (US)

(72) Inventors: Indranath Ghosh, Santa Clara, CA (US); Dmitri R Latypov, San Mateo, CA (US); Maria Mokhnatkina, San Jose, CA (US); Marcelo Peracoli N. De Almeida, Campinas (BR); Mikhall Petrov, Cupertino, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/713,018

(22) Filed: May 15, 2015

(65) Prior Publication Data
US 2016/0142913 A1 May 19, 2016

Related U.S. Application Data

(60) Provisional application No. 62/081,520, filed on Nov. 18, 2014.

(51) Int. Cl.
| | | |
|---|---|---|
| H04W 12/06 | (2009.01) | |
| H04W 12/08 | (2009.01) | |
| H04W 76/02 | (2009.01) | |
| H04W 8/00 | (2009.01) | |
| H04W 4/02 | (2009.01) | |
| H04L 29/06 | (2006.01) | |
| H04W 84/12 | (2009.01) | |

(52) U.S. Cl.
CPC ............ *H04W 12/06* (2013.01); *H04L 63/083* (2013.01); *H04L 63/104* (2013.01); *H04L 65/403* (2013.01); *H04W 4/021* (2013.01); *H04W 8/005* (2013.01); *H04W 12/08* (2013.01); *H04W 76/023* (2013.01); *H04W 84/12* (2013.01)

(58) Field of Classification Search
CPC ..... H04W 12/06; H04W 8/005; H04L 63/083; H04L 63/104
USPC .................................................. 726/5, 7, 31
See application file for complete search history.

(56) References Cited

U.S. PATENT DOCUMENTS

| | | |
|---|---|---|
| 8,289,979 B2 | 10/2012 | Hiie et al. |
| 8,639,831 B2 | 1/2014 | Painter et al. |
| 2005/0102381 A1* | 5/2005 | Jiang ..................... H04W 12/08 709/220 |
| 2008/0098123 A1 | 4/2008 | Huang et al. |

(Continued)

*Primary Examiner* — Haresh N Patel

(57) ABSTRACT

A method performed by a server to facilitate content sharing between multiple mobile electronic devices includes receiving, from a first mobile electronic device, a first content-sharing request and credentials for establishing a direct wireless connection between the first mobile electronic device and another mobile electronic device for sharing content of the first mobile electronic device. A first content-discovery request is received from a second mobile electronic device, and a location of the second mobile electronic device is also received. The credentials are communicated to the second mobile electronic device when the location indicates that the second mobile electronic device is within an established content-sharing geographical area.

20 Claims, 9 Drawing Sheets

(56) References Cited

U.S. PATENT DOCUMENTS

| | | | | |
|---|---|---|---|---|
| 2009/0327079 | A1* | 12/2009 | Parker | G06Q 30/02 |
| | | | | 705/14.55 |
| 2012/0008515 | A1* | 1/2012 | Jung | H04W 8/005 |
| | | | | 370/252 |
| 2014/0233458 | A1* | 8/2014 | Georgescu | H04W 76/007 |
| | | | | 370/328 |
| 2014/0259047 | A1* | 9/2014 | Bakar | H04N 21/6371 |
| | | | | 725/30 |
| 2014/0344446 | A1* | 11/2014 | Rjeili | H04L 43/04 |
| | | | | 709/224 |
| 2015/0327060 | A1* | 11/2015 | Gilson | H04L 67/16 |
| | | | | 726/7 |
| 2015/0332023 | A1* | 11/2015 | Gisolfi | H04L 63/12 |
| | | | | 726/31 |
| 2015/0358166 | A1* | 12/2015 | Redpath | G06F 21/64 |
| | | | | 713/176 |
| 2015/0373065 | A1* | 12/2015 | Holmquist | H04L 65/403 |
| | | | | 715/753 |
| 2016/0066252 | A1* | 3/2016 | Parron | H04W 48/16 |
| | | | | 455/434 |

\* cited by examiner

COMMUNICATING CREDENTIALS AND CONTENT BETWEEN MULTIPLE MOBILE ELECTRONIC DEVICES LOCATED WITHIN CONTENT SHARING GEOGRAPHICAL AREA

RELATED APPLICATIONS

The present application is related to and claims benefit under 35 U.S.C. §119(e) from U.S. Provisional Patent Application Ser. No. 62/081,520 filed Nov. 18, 2014, titled "Device and Method for Sharing Digital Content", the entire contents of which being incorporated herein by reference.

FIELD OF THE DISCLOSURE

The present disclosure relates to content sharing between multiple mobile electronic devices, and more particularly to content sharing between multiple mobile electronic devices using a direct wireless connection.

BACKGROUND

With the increased functional capabilities of mobile electronic devices, people are using these devices more often for storing content that they may want to reliably and quickly share with others. Sharing this content may involve transferring images, videos, documents, and the like, from one mobile electronic device to another. Using current mechanisms for content sharing can be time consuming in establishing a connection for the transfer, actually transferring the content, or both, which can lead to user dissatisfaction.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
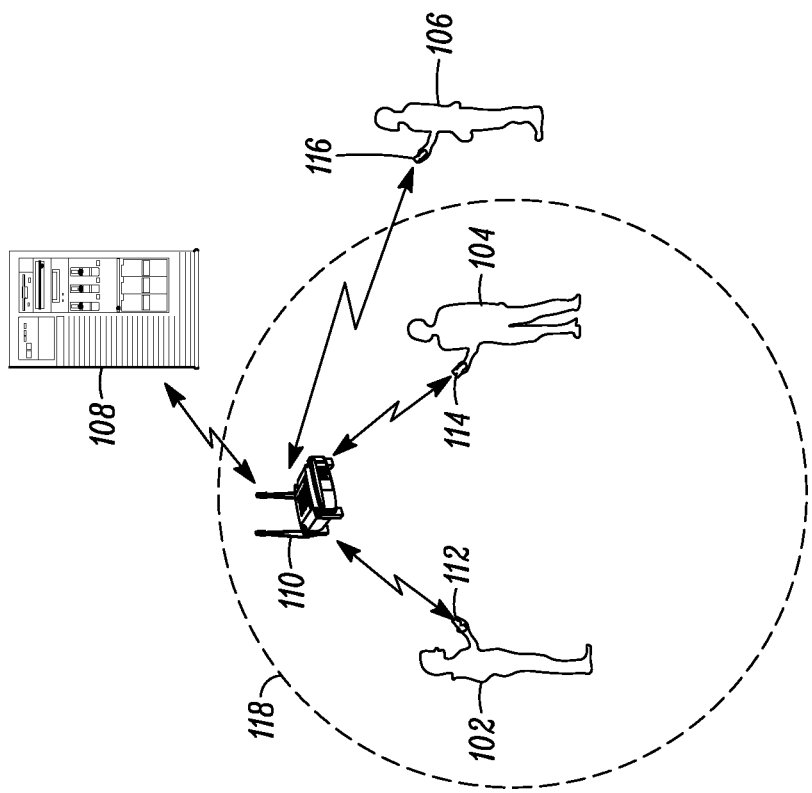
FIG. 1 is a schematic diagram illustrating an environment within which may be implemented methods and devices for facilitating content sharing between mobile electronic devices in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, a method is performed by a server to facilitate content sharing between multiple mobile electronic devices. The server receives, from a first mobile electronic device, a first content-sharing request and credentials for establishing a direct wireless connection between the first mobile electronic device and another mobile electronic device for sharing content of the first mobile electronic device. The server also receives, from a second mobile electronic device, a first content-discovery request and a location of the second mobile electronic device. The server communicates the credentials to the second mobile electronic device when the location indicates that the second mobile electronic device is within an established content-sharing geographical area.

For another embodiment, a method is performed by a first mobile electronic device to share content with another mobile electronic device. The method includes communicating, to a server, a content-sharing request and credentials for establishing a direct wireless connection with the first mobile electronic device for sharing content of the first mobile electronic device. Further, the first mobile device receives, from a second mobile electronic device within an established content-sharing geographical area, a connection request that includes at least some of the credentials communicated to the server. The first mobile electronic device responsively establishes the direct wireless connection with the second mobile electronic device.

FIG. 1, illustrates a schematic diagram 100 of an example environment within which may be implemented methods and devices for facilitating content sharing between multiple mobile electronic devices also referred to herein as mobile devices. In this particular illustration, a number of people 102, 104, 106 are interacting with their mobile electronic devices 112, 114, 116, while at a gathering, such as a party, family get-together, or a business meeting. During the gathering, one person 102 (sharer) may want to share content with one or more other people, e.g., 104 and/or 106, (intended recipient(s)). For example, if the people 102, 104, 106 are at a family gathering, user 102 may want to transfer a family picture or home video from her device 112 to her relatives' devices 114, 116. If the people 102, 104, 106 are at a business meeting, the user 102 may want to transfer a report or spreadsheet to her co-workers' devices 114, 116.

A mobile electronic device as described herein includes a smartphone, cellular phone, a phablet, a tablet, a personal digital assistant, a mobile phone, a media player, or another type of portable electronic device capable of establishing a direct wireless connection with another mobile electronic device and a connection with a server to exchange content in accordance with various aspects of the disclosed embodiments. Content, which is also referred to herein as media, includes information or data such as pictures, videos, multimedia, documents, electronic books, or any other types of data capable of being stored on a mobile electronic device and provided to an external device. The users' devices 112, 114, 116 illustratively communicate with a sever 108 using a wireless access point 110, for example a wireless fidelity (Wi-Fi) router.

For one embodiment, the access point 110 is configured to operate in accordance with various Wi-Fi standards (e.g., 802.11 a, b, g, n). In other embodiments, the access point 110 is configured to support other short range wireless technologies, such as HomeRF (Home Radio Frequency), Home NodeB (3G femtocell), Bluetooth, Worldwide Interoperability for Microwave Access (WiMax), and the like.

As an example, the server 108 is a content server that is configured to store digital content such as images, videos, documents, reports, or any other digital information, some of which is provided by one or more mobile electronic devices. In other examples, the functionality of the server 108 can be performed by a web server, a file transfer protocol server, a telnet server, a virtual server, or any other electronic device (e.g., a desktop computer) or server capable of communicating the messages described in relation to FIGS. 2, 5, 6 and 7.

Although, as illustrated, the devices 112, 114, 116 communicate with the server 108 using the access point 110, in other embodiments, the devices 112, 114, 116 are configured to communicate with server 108 using, for instance, base station infrastructure in cellular systems, in accordance with any of a variety of cellular-based communication technologies. Such technologies facilitate, for instance, analog communications (using e.g., Advanced Mobile Phone System—AMPS); digital communications (using, e.g., Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.); and/or next generation communications (using, e.g., Universal Mobile Telecommunication System (UMTS), Wideband CDMA (WCDMA), LTE, Institute of Electrical and Electronics Engineers (IEEE) 802.16, etc.) or variants thereof.

A geographical region within which the mobile electronic devices 112, 114, 116 can share content using the described and related embodiments is delineated as a content-sharing geographical area or content-sharing zone, which is labeled as 118 in FIG. 1. As shown, users 102 and 104 are within the content-sharing zone 118, and user 106 is outside of the content-sharing zone 118. Accordingly, the sharer 102 can share content with intended recipient 104 but not with intended recipient 106.

For one embodiment, the content-sharing geographical area 118 is established or set based on a location of the sharer 102 or her device 112. For instance, the geographical limits of the area 118 are based on a range within which the device 112 can effectively communicate content to other electronic devices via a direct wireless connection. However, other limits such as a hard geographic range limit around the sharer's device 112 (e.g., 10 or 15 feet from the device 112) can be used to establish the content-sharing zone 118. For one embodiment, the content-sharing zone 118 is user configurable or automatically configurable by the user's device. The device 112, thus, communicates to the server 108 an indication of the limits of the content-sharing zone 118, which, for example, are Cartesian coordinates for the device 112 or a center point for the zone 118 and limits for a radial distance from these coordinates. For another embodiment, the server 108 determines, establishes, or sets the geographical limits of the content-sharing zone 118.

Figure 2:
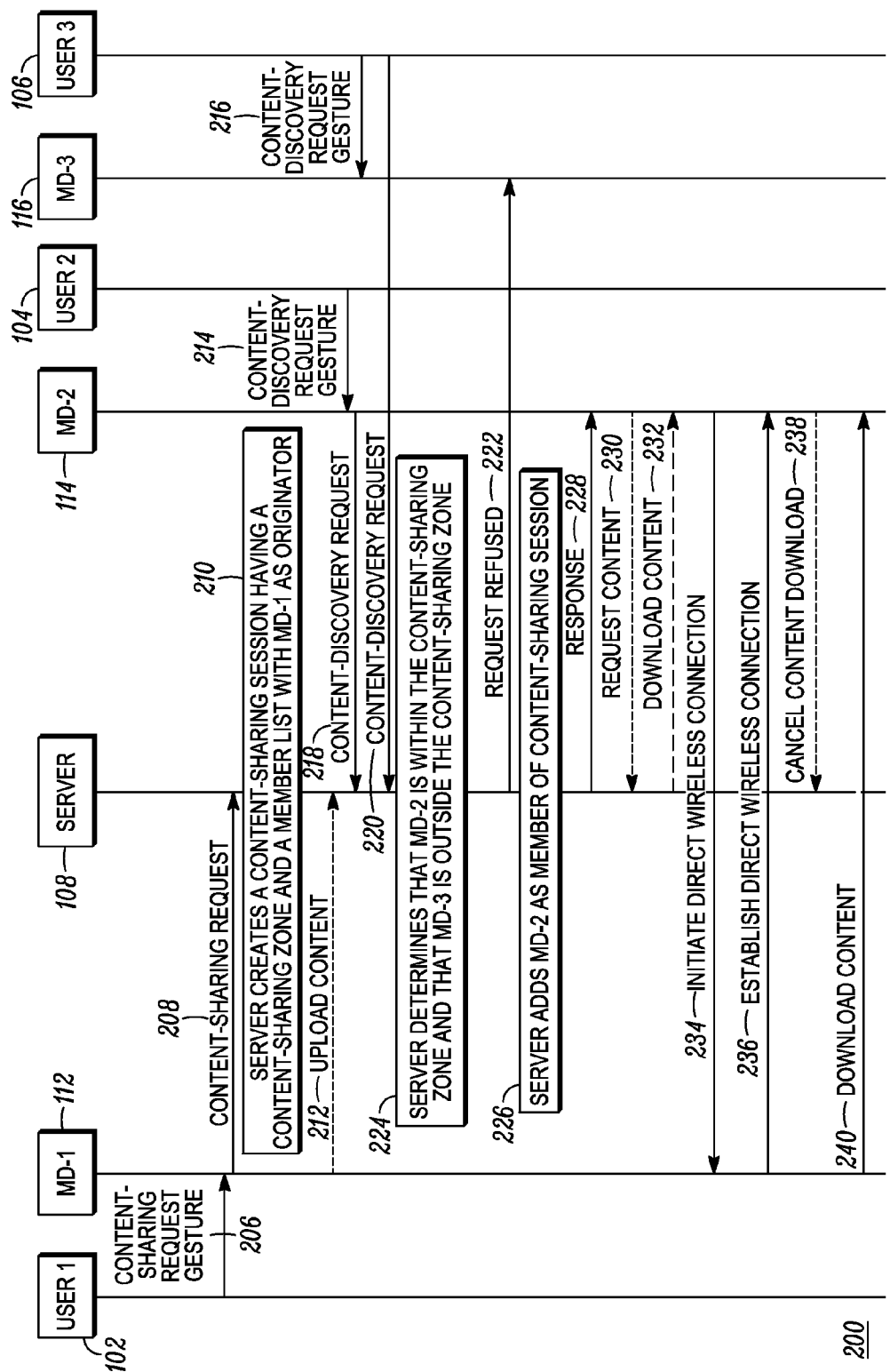
FIG. 2 illustrates a message sequence diagram for implementing content sharing between mobile electronic devices in accordance with an embodiment.
Figure 3:
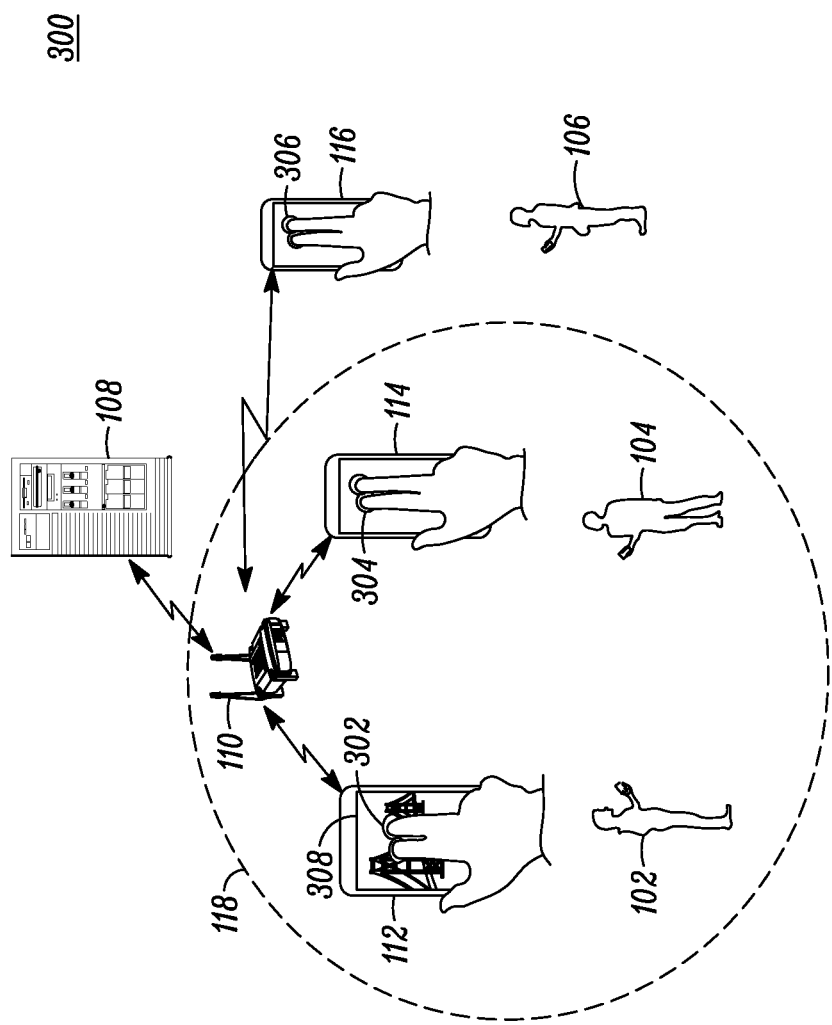
FIG. 3 illustrates gestures performed on a mobile electronic device to share and receive content in accordance with an embodiment.
Figure 4:
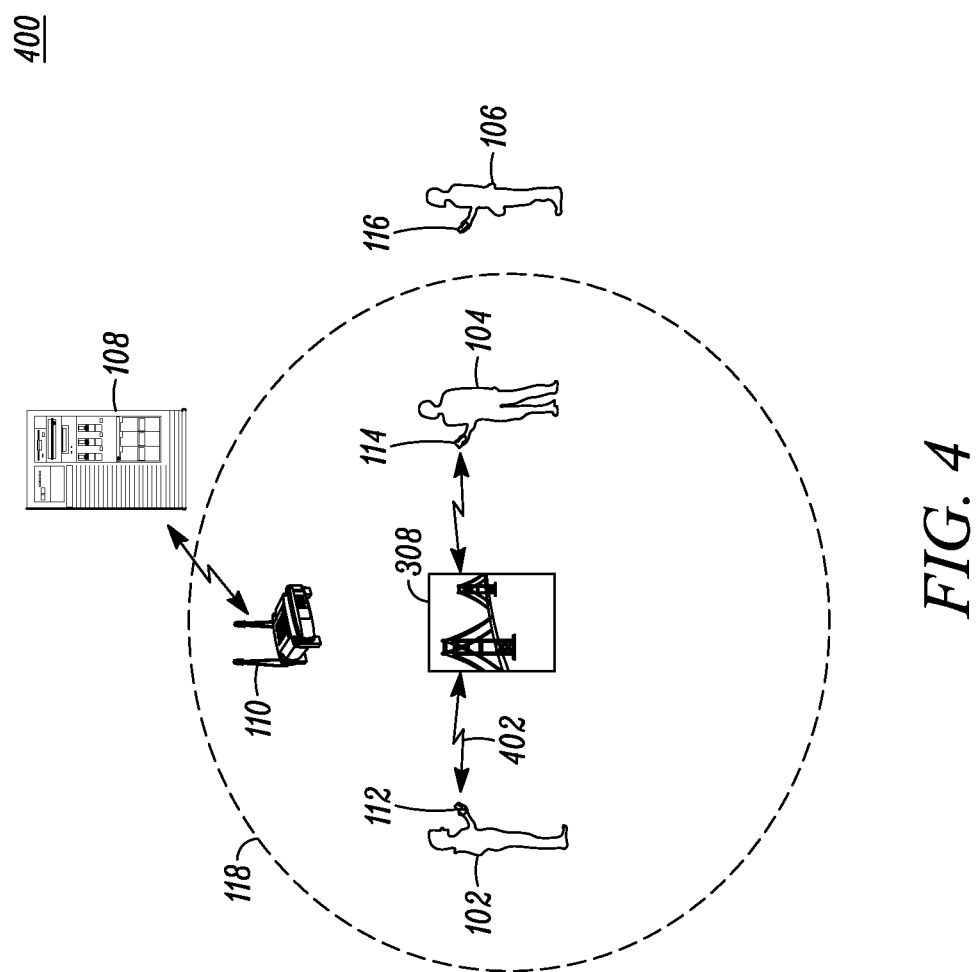
FIG. 4 illustrates content being transferred between mobile electronic devices and illustrates a direct wireless connection established between mobile electronic devices when sharing the content in accordance with an embodiment.

FIGS. 2, 3, and 4 are next currently described for ease of understanding the teachings herein. FIG. 2 illustrates a message sequence diagram 200 for facilitating content sharing among mobile electronic devices in accordance with some embodiments. FIG. 3 illustrates a diagram 300 demonstrating gestures performed on mobile electronic devices to share and receive content in accordance with an embodiment. FIG. 4 illustrates a diagram 400 showing the shared content being transferred between mobile electronic devices using a direct wireless connection in accordance with an embodiment.

FIGS. 2, 3, and 4 show three mobile electronic devices MD-1, MD-2 and MD-3, their corresponding users User 1, User 2, and User 3, and the server 108. As shown, MD-1, MD-2, and MD-3 represent mobile devices 112, 114, and 116, respectively, of FIG. 1. The server 108 facilitates content sharing among MD-1, MD-2, and MD-3 in accordance with the disclosed embodiments. For a particular embodiment, the mobile electronic devices MD-1, MD-2, and MD-3 and the server 108 depicted in FIGS. 1, 3, and 4 are configured with at least a processor and a communication interface operatively coupled and communicatively configured to operate in accordance with message sequence diagrams described by reference to FIGS. 2, 5, 6, and 7.

Illustratively, Hyper Text Transfer Protocol (HTTP), Session Initiation Protocol (SIP), or any other suitable protocol, standard and/or proprietary, which allows for message passing between electronic devices can be used to communicate messages depicted in the message sequence diagrams illustrated in FIGS. 2, 5, 6, and 7. In the drawings, the messages are depicted as a single line flowing in one direction between two devices to communicate certain information. However, depending on the particular protocol used and the information being communicated, the single line might represent a single message or multiple messages passed one way or both ways between the two devices to communicate the same information. However, for simplicity, some arrowed lines are referred to herein as a message (in the singular) or messaging, wherein a message or messaging is characterized by any structure used to convey information or data including, but not limited to, requests, responses, and content.

With reference first to FIG. 2, suppose users 102, 104, 106 desire to share content. For example, user 102 wants to share an image 308 (also referred to herein as a content item) with user 104 and user 106. To initiate content sharing, the sharer 102 selects the content she wishes to share and performs a content-sharing gesture 206 on a user-interface of her mobile electronic device 112. The content-sharing gesture 206, in one example embodiment, is a two-fingered upward swipe on or at the user interface of the mobile device 112 while the image 308 is displayed (see, e.g., reference 302 of FIG. 3). In other embodiments, the user can pretend to "throw" her device 112, for instance like throwing a ball or a flying disc, which the mobile electronic device 112 detects as a user input instructing the device to share the image 308. As another example, the user performs a "long press" gesture on the image 308 to select it and then uses the two-finger upward swipe 302 to share the image 308.

In response to detecting the content-sharing gesture on the user-interface, MD-1 communicates a content-sharing request message 208 to the server 108. For a particular embodiment, MD-1 also provides content 212 (in this case all or part of the image 308) to the server 108 with, e.g., in the same message, or separately from sending the content-sharing request. MD-1 also communicates, to the server 108, credentials for establishing a direct wireless connection for sharing content of the mobile electronic device 112. The credentials are communicated, in one embodiment, in the same message as the content-sharing request or can alternatively be sent in a separate message, depending at least in part on the protocol used to exchange information between the devices 108, 112, 114, 116.

To share content with other devices, in accordance with various embodiments disclosed herein, the sharing device 112 establishes a network that other devices can access using the credentials communicated to the server 108 with the content-sharing request 208. The credentials include, but are not limited to, a network identifier of the network established by the mobile electronic device 112 and a password for accessing the network established by the mobile electronic device 112. The other mobile electronic devices 114, 116 are said to establish a "direct wireless connection" with the mobile electronic device 112 upon joining the network using the credentials. This wireless connection is "direct" in that it does not require a connection to the server 108 for content transfer between the mobile devices 112, 114, and 116.

In response to receiving the content-sharing request message 208, the server 108 creates 210 a content-sharing session having associated therewith a content-sharing geographical area, e.g., content-sharing geographical area 118, and a member list with MD-1 as the originator. For one embodiment, the server 108 establishes the content-sharing geographical area 118 based on the geographical location of the mobile electronic device 112 and the range within which the devices 112, 114, 116 are capable of establishing a direct wireless connection. For example, if the sharer's device 112 is capable of establishing a direct wireless connection of up to 20 feet, the content-sharing geographical area 118 is centered based on a location of device 112 and has a radius that takes into account the 20 foot wireless range of the device 112. The content-sharing geographical area 118 can move with the device 112 or remain fixed as originally set.

The server 108 maintains the content-sharing session as a way of arbitrating which mobile devices are allowed to share content with other mobile devices based, for instance, on the location of the mobile devices relative to the content-sharing geographical area 118. For one embodiment, the users 102, 104, 106 agree on a session identifier, e.g., a number or name, which is input in conjunction with the content-sharing gesture or the content-discovery gesture. The session identifier is communicated to the server 108, for example, with the content-sharing request 208 or a content-discovery request that a recipient device provides to the server 108. Consequently, the content is only shared with members on the content-sharing list that join the content-sharing session using the session identifier associated with the content sharing-list. For another embodiment, the content-sharing list includes all mobile electronic devices within the content-sharing geographical area 118, and content is automatically allowed to be shared with mobile electronic devices within the content-sharing geographical area 118 without the identification of members involved in the content-sharing session.

To receive the content item, intended recipients 104, 106 perform a content-discovery request gesture, respectively 214 and 216, on their devices 114, 116. In one example, an intended recipient pretends to "catch" a thrown ball, and/or the intended recipient performs a two-finger downward swipe (see, e.g., references 304 and 306 of FIG. 3) to receive the content item. In response to the content-discovery request gestures, MD-2, MD-3 each respectively communicates a content-discovery request 218, 220 to the server 108.

For an embodiment, one or both of the mobile devices 104, 106 includes its location, for instance a GPS location, in the content-discovery request message. Alternatively, the server 108 determines the locations of MD-2 and MD-3 using, for instance, a network-based location method such as an angle of arrival method or a cell ID method. The server 108 uses the location information for MD-2 and MD-3 to determine 224 whether each device is within the content-sharing geographical area 118. For this example scenario, the server 108 determines that MD-2 is within the content-sharing geographical area 118 and determines that MD-3 is outside the content-sharing geographical area 118.

Because the location information indicates that the mobile electronic device 116 is outside of the established content-sharing geographical area 118, the server 108 sends a message 222 declining the content-discovery request 220. Because the mobile electronic device 114 is within the established content-sharing geographical area 118, the server 108, at block 226 and in response to the content-discovery request 218, adds MD-2 as a member of the content-sharing session that the server 108 has established. Consequently, the server 108 communicates a response 228 to MD-2 that includes the credentials for establishing a direct wireless connection to MD-1 without using the server 108. Moreover for a particular embodiment, the server 108 does not keep information associated with a content-sharing session for an indefinite amount of time. In such a case, the credentials must be communicated within a time window for maintaining the credentials.

MD-2 and MD-2 exchange messaging 234, 236 to initiate and establish a direct wireless connection using the credentials. FIG. 4 shows a direct wireless connection 402 between the mobile electronic devices 112 and 114, which does not involve or require a connection to the server 108 to exchange content. Additionally, for the embodiment shown in FIG. 4, the direct wireless connection 402 does not require or use any intermediary network components (e.g., the access point 110, a base station, a microcell, and the like) for transmitting, relaying, or processing data, signaling or other transmissions that occur between the devices 112, 114 over the direct wireless connection 402. Consequently, using the direct wireless connection 402, MD-1 can download the image 308, using messaging 240, directly from the sharing device 112 without the image 308 being transmitted, relayed or processed in any way by the access point 110 or the server 108.

For the embodiment where MD-1 also provides the image 308 or at least some portion of the image 308 to the server 108 in messaging 212, MD-2 can send a message 230 to the server 108 to request the content item 308. Responsive thereto, the server 108 begins providing the content item 308 to MD-2 in messaging 232. MD-2, thereby, downloads the content item 308 concurrently with establishing the direct wireless connection 402 with MD-1. Once the direct wireless connection 402 is established with MD-1, MD-2 cancels the content download in messaging 238 to the server 108. MD-2 can thus proceed toward completing the download of the image 308 using only the direct wireless connection 402.

Figure 5:
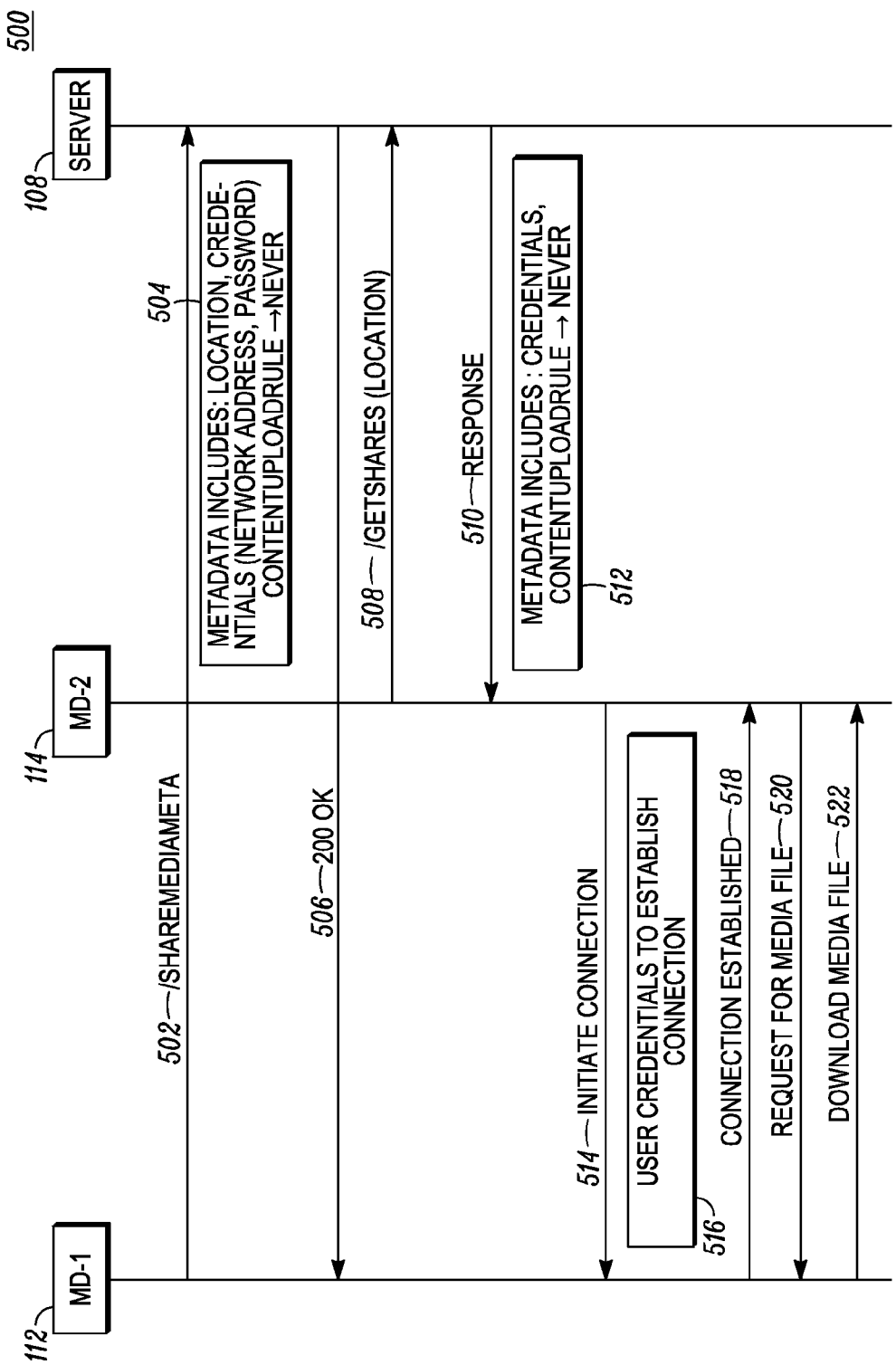
FIG. 5 illustrates a message sequence diagram for exchanging content among mobile electronic devices using only a direct wireless connection, in accordance with an embodiment.
Figure 6:
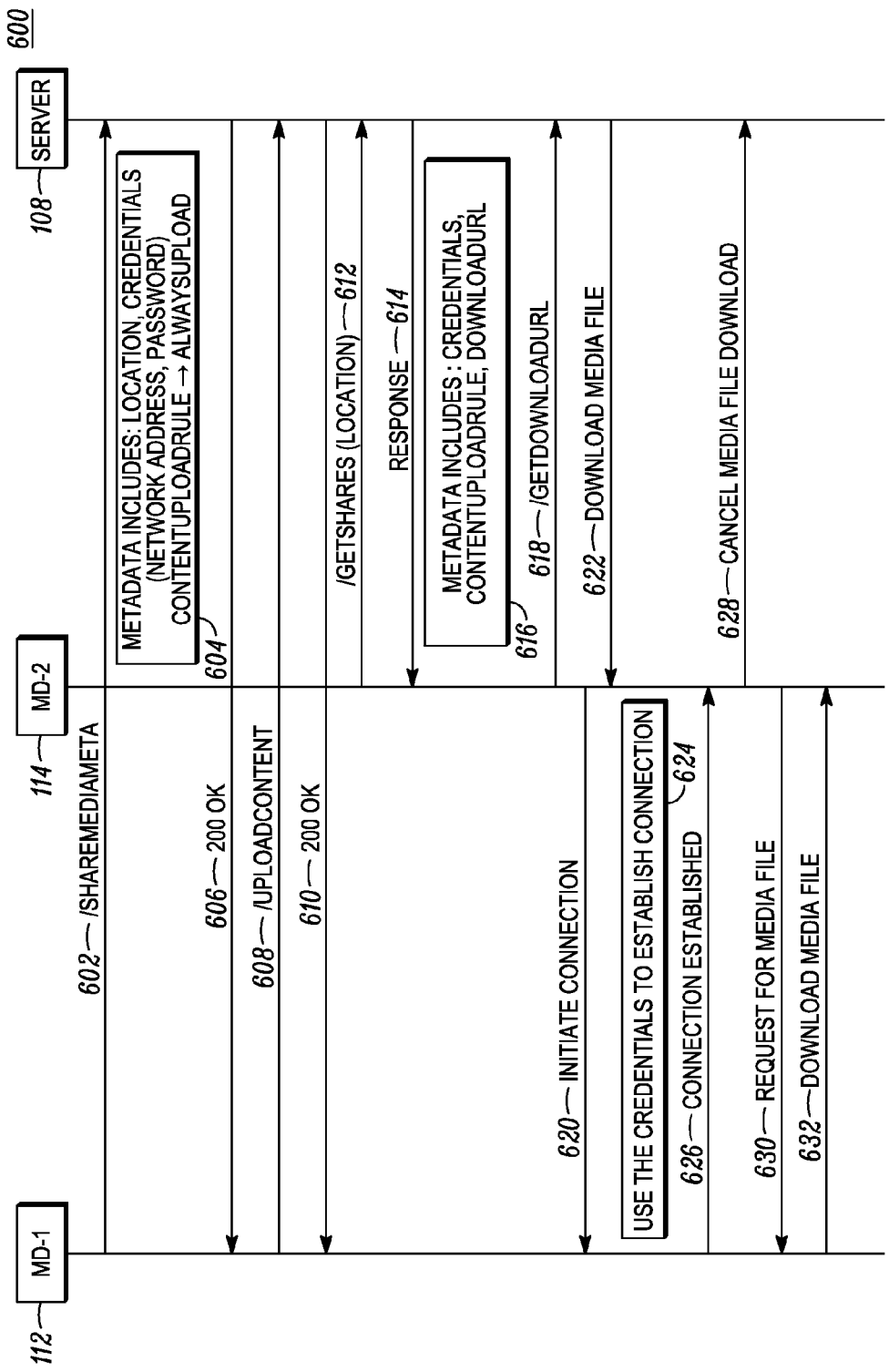
FIG. 6 illustrates a message sequence diagram for exchanging content among mobile electronic devices using both a direct wireless connection and a server connection, in accordance with an embodiment.
Figure 7:
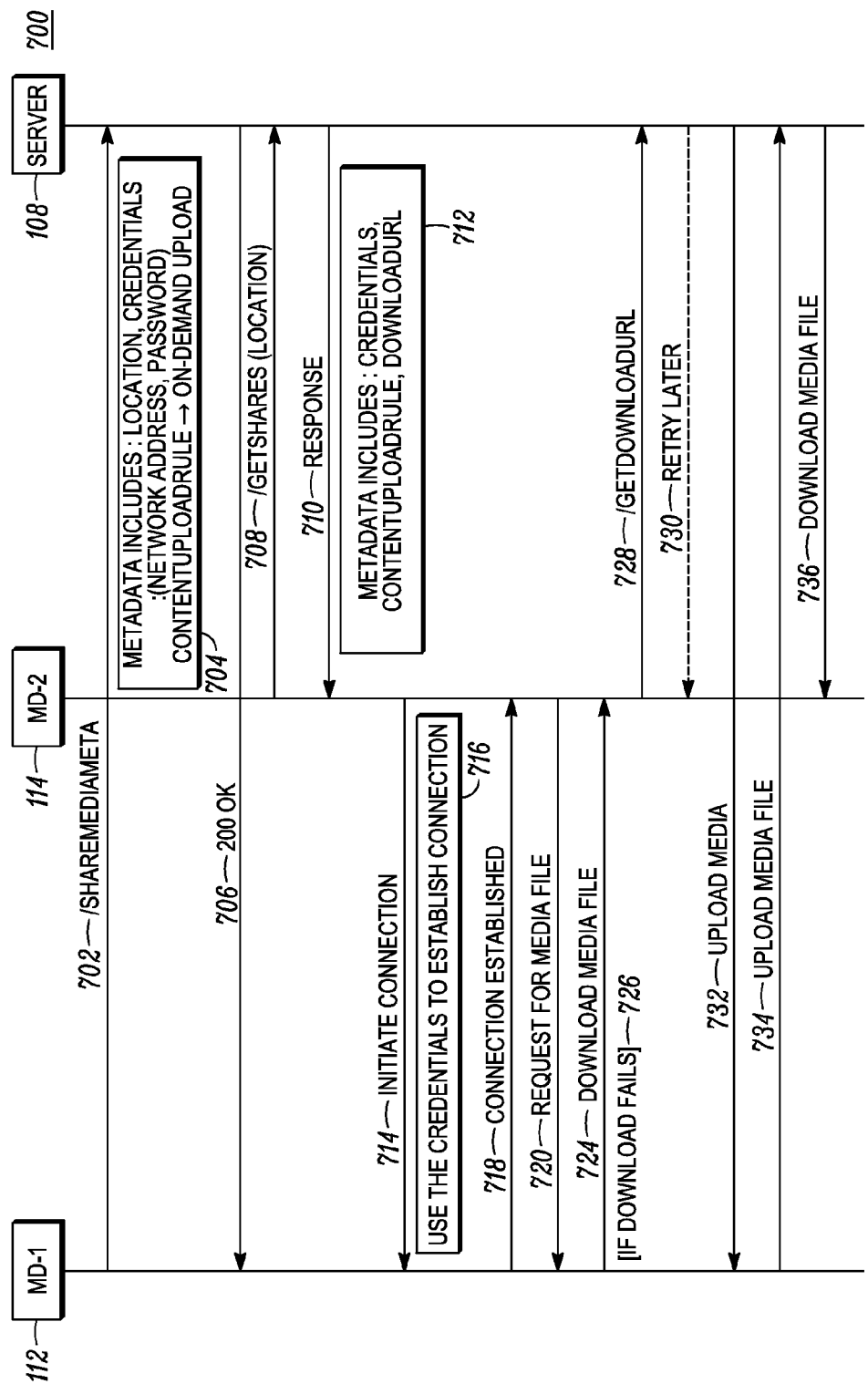
FIG. 7 illustrates a message sequence diagram for exchanging content among mobile electronic devices using a direct wireless connection and a server connection, on demand, in accordance with an embodiment.

As mentioned above, the particular message sequence between the devices to implement the present teachings depends, at least in part, on the protocol used and the information transmitted. FIGS. 5, 6, 7 illustrate embodiments where MD-1, MD-2, MD-3, and the server 108 use HTTP to exchange structured text within messages to implement aspects of the present teachings, for instance, aspects of the message sequence diagram 200 illustrated in FIG. 2. FIG. 5 contains a message sequence diagram 500 illustrating a particular scenario where the sharing device 112 never uploads content to the server.

Specifically, MD-1 sends a content-sharing request, which in this case is a single message 502, /shareMediaMeta, which is received by the server 108. The /shareMediaMeta message 502 includes metadata 502 the server 108 uses to facilitate establishment of a direct wireless connection between mobile devices that want to join the content-sharing session initiated by MD-1. Illustratively, the metadata 504 contains a location of MD-1, information or credentials needed to establish the direct wireless connection with MD-1, and a content upload rule. The location is, for example, a geographical location such as an absolute latitude and longitude, a universal transverse mercator (UTM) coordinate, and the like. In other examples, the location is provided as a location within a building (e.g., a room number), or a location relative to a network component (e.g., an access point, a cell site, a microcell, etc.). In this particular embodiment, the credentials include a network address, for instance a service set identifier or network name, and a password used to access the network.

The content upload rule, contentUploadRule, indicates whether sharing the content of MD-1 is allowed only using the direct wireless connection or using both the direct wireless connection and the connection between the server 108 and MD-2. In this particular case, the content upload rule is set to 'never.' This indicates to the server 108 that MD-1 will not upload content to the server 108 for sharing with other mobile devices that are part of the content-sharing session established for MD-1. In response to receiving the /shareMediaMeta message 502, the server 108 communicates a 200 OK message 506. The 200 OK message indicates that the server 108 successfully received the content-sharing request 502 and accompanying information 504.

MD-2 sends a content-discovery request 508, /getShares, which the content server 108 receives. The content-discovery request 508 includes, for example, a location of MD-2. Upon determining that MD-2 is within the content-sharing geographical area 118, the content server 108 communicates metadata 512 in a response 510 to MD-2. The metadata 512 includes the credentials that the sharing device MD-1 communicated to the server 108. The server 108 also communicates with the response 510 to MD-2 when the location indicates that the MD-2 is within the established content-sharing geographical area, an indication, (e.g., content upload rule) of whether sharing the content of MD-1 is allowed only using the direct wireless connection 402 or using both the direct wireless connection 402 and the connection between the server 108 and MD-2. In this case, the content upload rule is set to never, so MD-2 will not use its connection to the server 108 to download content of MD-1.

MD-2 communicates a connection request 514 to MD-1 to initiate establishment of the direct wireless connection with MD-1 using the credentials. In this case, the message 514 contains credentials 516 that MD-2 received from the server 108. If the credentials 516 are valid, the direct wireless connection 402 is established at 518.

In one example embodiment, the direct wireless connection 402 is instantiated using Wi-Fi Direct to establish a peer-to-peer group with MD-1 performing a group owner role for the Wi-Fi Direct wireless connection. The Wi-Fi Direct group owner acts as an arbitrator of a group which other devices may join. A device that wants to join the group, communicates credentials including the network address and password to the group owner. The network address identifies the network established by the group owner, and the password is used to access the network. The group owner determines whether the potential member has communicated the proper credentials and if so, allows the prospective member to join the group.

When forming a typical Wi-Fi Direct group, candidate devices attempting to form a Wi-Fi Direct group must go through a Wi-Fi Direct discovery process to determine which devices can join the group and which device will act as a group owner. The discovery process involves passing a number of messages between the candidate devices.

According to aspects of the present disclosure, however, the sharing device is established as the group owner without need for the message negotiation to determine the group owner from among the candidate devices. Group membership is illustratively based on the credentials, location of a perspective member relative to the content-sharing geographical area 118, and, optionally, the session identifier. Group membership is not established by using a discovery process. Consequently, the receiving device 114 bypasses at least some and in some instances all of the Wi-Fi Direct discovery process when establishing the Wi-Fi Direct wireless connection using the credentials communicated to the server. This bypassing of the Wi-Fi Direct discovery process can significantly decrease the amount of time to transfer content between MD-1 and MD-3 as compared to some prior art methods of sharing content.

In other embodiments, the direct wireless connection between the devices is formed using Bluetooth, near field communications (NFC), radio frequency identification (RFID), or any other type of wireless communication technology capable of enabling the mobile devices to establish a direct wireless connection for sharing content. In these alternative embodiments, the credentials can include information similar to the network address and password for establishing a direct wireless connection using one of these other technologies. In some of these embodiments, the credentials can also include an indicator identifying the wireless access technology, e.g., Bluetooth, NFC, RFID, etc.

Once the direct wireless connection 402 is established at 518, MD-2 sends a request 520 for content from MD-1. In response to the request 520 for content, MD-1 downloads a content item, in this case the image 308, to MD-2 via messaging 522 sent over the direct wireless connection 402.

FIGS. 6 and 7 illustrate embodiments where MD-1 communicates only a first part of its content using the direct wireless connection 402. Particularly, FIG. 6 shows an example message sequence diagram 600 where a second part of the content of MD-1 is always communicated by the server 108 to MD-2, for instance, before a direct wireless connection is established between MD-1 and MD-2. By contrast, FIG. 7 shows an example message sequence diagram 700 where a second part of the content of MD-1 is communicated by the server 108 to MD-2 on-demand, such as upon a loss of the direct wireless connection 402 between MD-1 and MD-2.

According to the message sequence diagram 600, MD-1 sends a content-sharing request 602, /shareMediaMeta to the server 108. The content-sharing request 602 includes metadata 604 containing the geographical location of MD-1, credentials to establish a direct wireless connection with MD-1, and a content upload rule. In this scenario, however, the content upload rule is set to "always upload", which indicates that sharing the content using the server 108 is always allowed. Correspondingly, the MD-1 can also provide to the server 108 an uploadURL (not shown), which is illustratively a uniform resource locator (URL) that indicates or points to the content that MD-1 intends to share. The uploadURL can be included in the content-sharing request message 602, /shareMediaMeta, as part of the metadata 604, but can alternatively be included in a separate message. The content server 108 acknowledges successful receipt of the content-sharing request 602 using a 200 OK response 606.

For one embodiment, upon receiving the acknowledgement message 606, MD-1 uploads to the server 108, all or part of the content, e.g., 308, using messaging 608 referred to as /uploadContent. MD-1 performs this upload prior to another mobile device establishing a direct wireless connection with MD-1. For another embodiment, the server 108 sends the uploadURL in a message (not shown) to MD-1 and responsively receives the content. The server 108 communicates a 200 OK response 610 to MD-1 to indicate successful receipt of the content.

MD-2 indicates its intent to receive shared content of MD-1 from the server 108 by communicating a content-discovery request 612, e.g., /getShares, which includes the location of MD-2. Upon determining that MD-2 is within the content-sharing geographical area 118, the server 108 communicates a response 614 to the content-discovery request 612. The response includes metadata 616 having the credentials provided by MD-1, the content upload rule, and a downloadURL for use in retrieving the content of MD-1 stored on the server 108.

In this embodiment, prior to or contemporaneously with establishing a direct wireless connection with MD-1, MD-2 sends a request for content 618, /getDownloadURL, to the server 108. The request 618 contains the downloadURL, which initiates the server 108 to begin downloading the content of MD-1 to MD-2 in messaging 622. In this case, where the content is a picture 308, the sever 108 may, responsively, begin sending frames of the picture to MD-2.

To establish the direct wireless connection to MD-1, MD-2 sends a connection request 620 to MD-1 and uses credentials 624 received from the server 108 to establish the connection 402 at 626. Once the direct wireless connection 402, e.g., a Wi-Fi Direct connection, is established between MD-1 and MD-2, MD-2 sends a message 628 to the server 108 to cancel the content download from the server 108.

MD-2 communicates a request 630 for content to MD-1. Responsively, MD-1 downloads content files to MD-2 in messaging 632. For a further embodiment, the server 108 communicates to MD-1 where in the content the download ceased over the connection between the server 108 and MD-2 so that MD-1 does not repeat or repeats little of the content that the server 108 already provided to MD-2.

According to the message sequence diagram 700, MD-1 communicates a content-sharing request 702, /shareMediaMeta, which is received by the server 108. The content-sharing request 702 contains metadata 704, which includes a location of MD-1, credentials to establish a direct wireless connection with MD-1, e.g., the network address and password, and a content upload rule of 'on-demand.' In this embodiment, MD-1 communicates to the server 108 a content upload rule, which indicates that sharing content using the server 108 is allowed on-demand, where the content is provided to the server in response to a request for the content.

A content upload rule of on-demand means, that the server 108 provides content to MD-2 when MD-2 requests the content from the server 108. In some scenarios, this entails the server 108 uploading the content from MD-1 in response to the request for content from MD-2. Correspondingly, MD-1 can also provide to the server 108 an uploadURL (not shown) that indicates or points to content that MD-1 intends to share. The uploadURL can be included in the content-sharing request message 702 /shareMediaMeta, as part of the metadata 704, but can alternatively be included in a separate message. The server 108 communicates a 200 OK response 706 to MD-1 to indicate receipt of the content-sharing request 702 and accompanying information 704.

MD-2 sends a content-discovery request 708, /getShares, which is received by the server 108. The content-discovery request 708 includes a location of MD-2. Upon determining that MD-2 is within the content-sharing geographical area 118, the server 108 communicates to MD-2 a response 710 to the content-discovery request 708. The response 710 contains metadata 712 that includes credentials provided by MD-1 for establishing the direct wireless connection, the content upload rule, and a downloadURL used to retrieve the content of MD-1 from the server 108.

MD-2 sends a connection request 714 to initiate the establishment of a direct wireless connection with MD-1 using credentials 716. When the credentials 716 are valid, the direct wireless connection 402 is established at 718. Once the direct wireless connection 402 is established, MD-2 sends a request 720 for content from MD-1. Responsively, MD-1 downloads the content in messaging 724 to MD-2 using the direct wireless connection 402.

At some point during the content transfer in this example scenario, the direct wireless connection 402 fails, at 726. For instance, loss of the direct wireless connection might occur because of interference between MD-1 and MD-2. For one example, one of the users 102 or 104 is positioned behind an object such as a wall, which temporarily interferes with the signal between MD-1 and MD-2. Alternatively, or the user 104 momentarily steps outside the effective transmission range of MD-1 causing a temporary loss of signal. Consequently, MD-2 sends a request 728, /getDownloadURL, to the server 108 to continue the content download from the server 108. The request 728 contains the DownloadURL from the metadata 712.

Since the server 108 does not yet have the content, the sever 108 can send a retry later response 730 to MD-2 instructing MD-2 to try downloading the content at a later time. In any event, the server 108 sends an upload content request 732 to MD-1 to get the content identified by the uploadURL. Responsively, MD-1 uploads the identified content to the server 108 in messaging 734, which the server 108 begins downloading to MD-2 in messaging 736. For a further embodiment, MD-1 communicates to the server 108 where in the content, the download stopped over the direct wireless connection 402 so that the server 108 does not repeat or repeats little of the content that MD-1 already provided to MD-2.

For another embodiment, if the direct wireless connection 402 is re-established, MD-2 cancels the content download from the server 108 and continues the content download from MD-1 over the direct wireless connection 402. For yet another embodiment, MD-2 requests and receives the content of MD-1 from the server 108 until it establishes the direct wireless connection 402 with MD-1.

Figure 8:
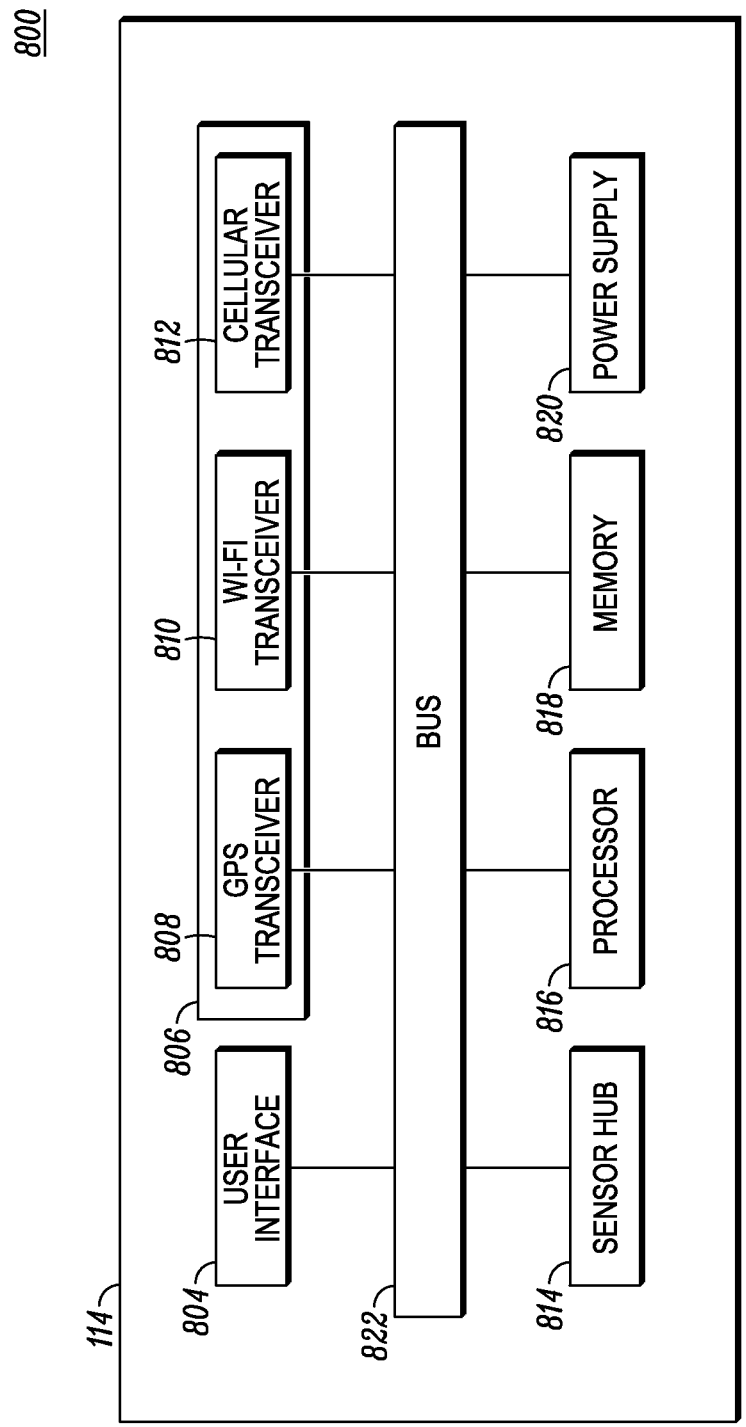
FIG. 8 illustrates a block diagram of internal hardware components of a mobile electronic device configured in accordance with an embodiment.

FIG. 8 illustrates a block diagram of example internal hardware components 800 of a mobile electronic device, such as the mobile electronic device 114 of FIG. 1, configured or designed to operate in accordance with the present teachings. Although device 114 is offered as an example in this illustration, the descriptions applied to device 114 equally apply to mobile electronic devices 112 and 116. As shown in FIG. 8, the internal elements or components 800 include a user interface 804, a communication interface 806 including one or more wireless transceivers 808, 810, 812, a sensor hub 814, one or more processors 816, memory 818, and a power supply 820. As further illustrated, the internal components 800 are coupled to one another, and in communication with one another, by way of one or more internal communication links 822, for instance an internal bus.

A limited number of device components 804, 806, 814, 816, 818, 820, and 822 are shown at 800 for ease of illustration, but other embodiments may include a lesser or greater number of such components in a mobile electronic device, such as device 114. Moreover, other elements needed for a commercial embodiment of a device that incorporates the components shown at 800 are omitted from FIG. 8 for clarity in describing the enclosed embodiments.

In one example embodiment, the internal components 800 shown in FIG. 8 are adapted such that the communication interface 806 and the processor 816 are operatively coupled and cooperatively configured to communicate, to the server 108, a content-discovery request for content of the mobile electronic device 112. The communication interface 806 and the processor 816 are also operatively coupled and cooperatively configured to receive, from the server 108 when a location of the mobile electronic device 114 is within an established content-sharing geographical area 118, a response that includes credentials for establishing a direct wireless connection with the mobile electronic device 112. Furthermore, the internal components 800 are adaptable to communicate a connection request to the mobile electronic device 112 to establish the direct wireless connection using the credentials received from the server 108.

The user interface 804 enables a human to interact with the internal components of the mobile electronic device 800. For example, a touchscreen forming part of or integrated with the user interface 804 provides a means for receiving tactile (or touch) input resulting from a user's finger or some other input device such as a stylus, glove, fingernail, etc., contacting the user interface 804. The contact with the user interface 804 and the resulting touch input is characterized by at least one of a motion, an input sequence, or a pattern on and/or directed at the touchscreen. A contact with the user interface 804 includes a physical and/or a proximal interaction with the touchscreen of the user interface 804 (depending on the type of touchscreen technology implemented), which is sensed by sensing hardware included within the touchscreen 106. One example contact with the user interface 804 is characterized as a content-sharing gesture or a content-discovery gesture as described in accordance with embodiments disclosed herein.

In the present embodiment of FIG. 8, the communication interface 806 particularly includes a global positioning system (GPS) transceiver 808, a Wi-Fi transceiver 810, and a cellular transceiver 812. The GPS transceiver 808 enables the determination of the location of the mobile electronic device 114 in accordance with embodiments disclosed herein. The Wi-Fi transceiver 810 is configured to conduct Wi-Fi communications in accordance with the IEEE 802.11 (a, b, g, or n) standard. In other embodiments, the Wi-Fi transceiver 810 instead (or in addition) conducts other types of communications commonly understood as being encompassed within Wi-Fi communications such as some types of local area (e.g., Wi-Fi Peer-to-Peer, Wi-Fi Direct) communications in accordance with embodiments disclosed herein.

The cellular transceiver 812 conducts cellular communications of voice and data over wireless connections using any suitable wireless technology, such as Third Generation (3G), Fourth Generation (4G), 4G Long Term Evolution (LTE), vis-à-vis cell towers or base stations. In other embodiments, the cellular transceiver 812 utilizes any of a variety of other cellular-based communication technologies such as: analog communication technologies (using Advanced Mobile Phone System—AMPS); digital communication technologies (using Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.); and/or next generation communication technologies (using Universal Mobile Telecommunication System (UMTS), Wideband CDMA (WCDMA), LTE, Institute of Electrical and Electronics Engineers (IEEE) standard 802.16, etc.) or variants thereof. The cellular transceiver 812 interoperating with one or more cell towers or base stations is operable to determine a location of the device 114 in accordance with aspects of the disclosed embodiments.

In one particular embodiment, the communication interface 806 by way of the Wi-Fi transceiver and/or the cellular transceiver 812 is configured to communicate with the server 108 via one or more intermediary components (e.g., the access point 110, base stations, mirco cells, and the like) to perform various aspects of the disclosed embodiments, such as, communicating content to the server 108. The communication interface 806 is also configured to communicate with the communication interface of another mobile electronic device to transfer content and establish a direct wireless connection in accordance with the message flows described in FIGS. 2, 5, 6, and 7.

In the example scenario described in relation to FIG. 6, the processor 816 and communication interface 806 are cooperatively configured to request and receive, from the server 108, a first portion of content of the mobile electronic device 112 before the direct wireless connection is established, and request and receive a second portion of content of the mobile electronic device 112 using a direct wireless connection, where the direct wireless connection is established between the mobile electronic device 112 and the mobile electronic device 114. Furthermore, in the scenario described in relation to FIG. 7, the communication interface 806 and the processor 816 are also cooperatively configured to request and receive a first portion of the content of the mobile electronic device 112 using a direct wireless connection, and request and receive a second portion of the content of the mobile electronic device 112 from the server 108 after a loss of the direct wireless connection, where the direct wireless connection is established between the mobile electronic device 112 and the mobile electronic device 114.

The sensor hub 814 manages the function of one or more sensors of the sensor hub 814. The sensors (which are not specifically shown) include, for example, proximity sensors (e.g., a light detecting sensor, an ultrasound transceiver, or an infrared transceiver), touch sensors, altitude sensors, an accelerometer, a tilt sensor, and a gyroscope, to name a few.

In addition, in an embodiment, the sensor hub 814 can be operationally coupled to the processors 816 to monitor these components of mobile device 114. The processor 816 uses, for example, one or more inputs from the sensors to determine whether a content-sharing gesture, e.g., a "throwing" motion, or a content-discovery gesture, e.g., a "catching" motion, is performed with the device 114.

The processor 816 provides main or core processing capabilities within the electronic device 114 and, in an embodiment, serves as an application processor. For example, the processor 816 is implemented as a system-on-chip (SoC) that supports word processing applications, email and text messaging applications, video and other image-related and/or multimedia applications, etc., executable on the electronic device 114. Additionally, the processor 816 processes computer-executable instructions and in conjunction with other components 804, 806, 814, 818, 820 control the operation of the device 114 to perform various aspects of embodiments disclosed herein. For example, the processor 816 and the communication interface 806 are cooperatively configured to receive, from the server 108, an indication that sharing content of the mobile electronic device 112 is also allowed using the server 108. The indication notifies the mobile electronic device 114 or whether sharing the content of the mobile electronic device 112 using the server 108 is always allowed (see FIG. 6 scenario) or is allowed on-demand (see FIG. 7 scenario).

The memory portion 818 of the internal components 800 encompasses, in some embodiments, one or more memory devices of any of a variety of forms (e.g., read-only memory, random access memory, static random access memory, dynamic random access memory, etc.), and the processor 816 uses the memory device(s) to store and retrieve data. In some embodiments, the memory portion 818 is integrated with the processor 816 in a single device (e.g., a processing device including memory or processor-in-memory (PIM)), albeit such a single device still typically has distinct portions/sections that perform the different processing and memory functions and that are considered, in one example, separate devices. In some alternate embodiments, the memory portion 818 of the mobile device 114 is supplemented or replaced by other memory portion(s) located elsewhere apart from the mobile device and, in such embodiments, the mobile device 114 is in communication with or accesses such other memory device(s) by way of any of various communication techniques, for example, wireless communications afforded by the wireless transceivers 806. The power supply 820, such as a battery, provides power to the other internal components 800 while enabling the mobile device 114 to be portable.

Figure 9:
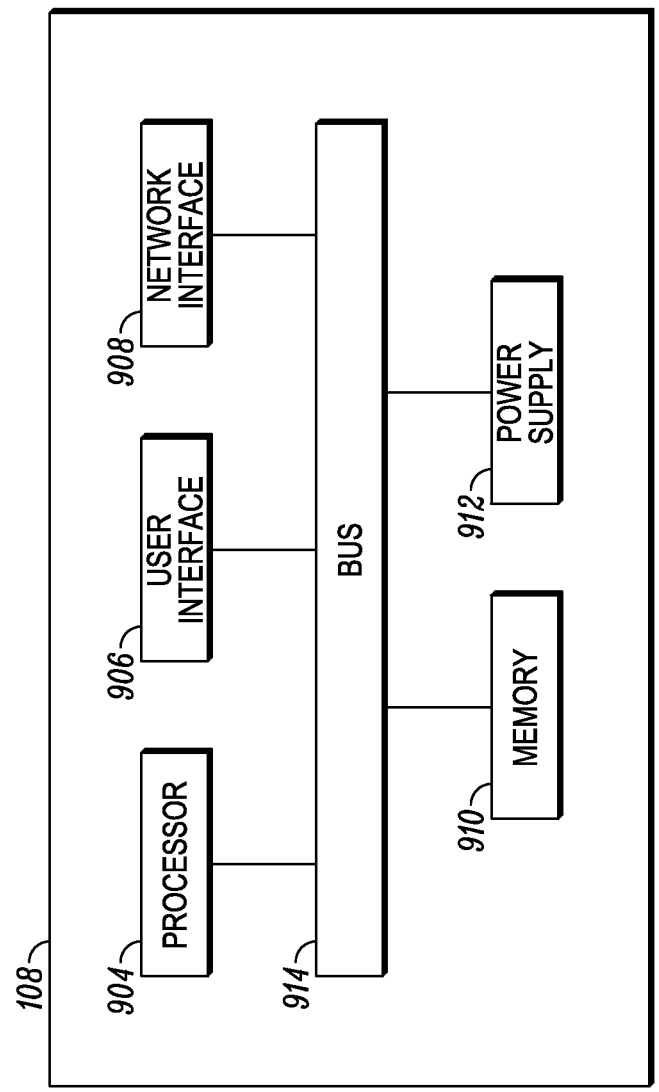
FIG. 9 illustrates a block diagram of internal hardware components of a server configured in accordance with an embodiment.

FIG. 9 illustrates a block diagram of various internal hardware elements of components 900 of an electronic device, such as the server 108 of FIGS. 1-7, which is configured to facilitate content sharing between multiple mobile electronic devices in accordance with the present teachings. As shown in FIG. 9, the internal components 900 include one or more processors 904, a user interface 906, a network interface 908, a memory component 910, and a power supply 912, which are configured to operate in accordance with functionality described herein. As further illustrated, the internal components 900 are coupled to one another, and in communication with one another, by way of one or more internal communication links 914, for instance an internal bus. A limited number of device components 904, 906, 908, 910, 912, and 914 are shown at 900 for ease of illustration, but other embodiments may include a lesser or greater number of such components in an electronic device, such as the server 108. Moreover, other elements needed for a commercial embodiment of an electronic device that incorporates the components shown at 900 are omitted from FIG. 9 for clarity in describing the enclosed embodiments.

The processor 904 includes arithmetic logic and registers necessary to perform the digital processing required by the server 108 to, for example, facilitate content sharing between multiple mobile electronic devices in a manner consistent with the embodiments described herein. For one embodiment, the processor 904 represents a primary microprocessor or central processing unit (CPU) of the server 108 that is configured with functionality in accordance with embodiments of the present disclosure, for instance as described in detail with respect to the FIGS. 2-7.

The user interface 906 enables a human to interact with the server 108. In one example scenario, the user interface 906 enables a person to configure the components of the server 108, such as the memory 910 and processor 904, with information pertaining to functionality in accordance with the disclosed teachings. Example user interfaces 906 include, but are not limited to devices such as, keyboards, touchscreens, a mouse, voice recognition systems, joysticks, trackballs, and the like.

The network interface 908 enables the server 108 to communicate with devices, such as the mobile devices 112, 114, 116 that are external to the server 108 in either a wired or wireless manner to receive and/or send messages in support of performing the teachings as described herein. The server 108, in one example, communicates in a wireless manner via one or more transceivers (not specifically shown) that are part of the network interface 908. A wired interface (not specifically shown) of the network interface 908 includes, for example, Ethernet, Token Ring, Fiber Distributed Data Interface, Asynchronous Transfer Mode, X.25 and the like.

The memory component 910 in various embodiments can include one or more of: volatile memory elements, such as random access memory (RAM); or non-volatile memory elements, such as a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), or a Flash memory. In an embodiment, the processor 904 uses the memory component 910 to store and retrieve data. In some embodiments, the memory component 910 is integrated with the processor 904 into a single component such as on an integrated circuit. However, such a single component still usually has distinct portions/sections that perform the different processing and memory functions.

The data that is stored by the memory component 910 includes, but need not be limited to, operating systems, programs (e.g., applications, protocols, and other code), and informational data. Each operating system includes executable code that controls basic functions of the server 108, such as interaction among the various components included among the internal components 900, communication with external devices via the network interface 908, and storage and retrieval of programs and data, to and from the memory component 910. As for programs, each program includes executable code that utilizes an operating system to provide more specific functionality, such as file system service and handling of protected and unprotected data stored in the memory component 910. Such programs include, among other things, programming for enabling the server 108 to perform methods or processes such as described below by reference to FIGS. 2-7. The power supply 912, such as a battery, provides power to the other internal components 900 to enable their functionality.

When configured in accordance with the teachings herein, multiple mobile electronic devices share content via a direct wireless connection established among the multiple mobile electronic devices. The direct wireless connection provides a faster data transfer speed than a cellular wireless connection (e.g., AMPS, TDMA, CDMA, UMTS, WCDMA, LTE, and the like). Also, data transfers performed using the direct wireless connection are not billed to the user, which provides the subscriber a cheaper way of quickly and reliably transferring content from her device to the device of other users. A server determines which mobile devices are permitted to join a content-sharing session, and the server communicates credentials for joining the content-sharing session to prospective mobile electronic devices. Consequently, a discovery process, normally needed to establish members of a group that shares content using a direct wireless connection, is bypassed. Because the discovery process is bypassed, the direct wireless connection is established more quickly than if the discovery process were performed. Further, in some embodiments, content is transferred between mobile electronic devices via the server if the wireless connection fails. This back-up method of transferring the content provides for a more reliable way of transferring content among multiple mobile electronic devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically.

A device or structure that is "configured" in a certain way is configured in at least that way, but may also be configured in ways that are not listed. As used herein, the terms "configured to", "configured with", "arranged to", "arranged with", "capable of" and any like or similar terms mean that hardware elements of the device or structure are at least physically arranged, connected, and or coupled to enable the device or structure to function as intended.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method performed by a server to facilitate content sharing between multiple mobile electronic devices, the method comprising:
   receiving, from a first mobile electronic device, a first content-sharing request and credentials for establishing a direct wireless connection between the first mobile electronic device and another mobile electronic device for sharing content of the first mobile electronic device;
   receiving, from a second mobile electronic device, a first content-discovery request;
   receiving a location of the second mobile electronic device;
   communicating the credentials to the second mobile electronic device when the location indicates that the second mobile electronic device is within an established content-sharing geographical area; and
   communicating, to the second mobile electronic device, an indication of whether sharing the content of the first mobile electronic device is allowed only using the direct wireless connection or using both the direct wireless connection and a connection between the server and the second mobile electronic device.

2. The method of claim 1, wherein communicating the credentials comprises communicating a network identifier of a network established by the first mobile electronic device and a password for accessing the network established by the first mobile electronic device.

3. The method of claim 1, wherein the credentials are communicated within a time window for maintaining the credentials.

4. The method of claim 1 further comprising the server communicating the indication of whether sharing the content of the first mobile electronic device is allowed only using the direct wireless connection or using both the direct wireless connection and the connection between the server and the second mobile electronic device, when the location indicates that the second mobile electronic device is within the established content-sharing geographical area.

5. The method of claim 1 further comprising the server receiving, from the first mobile electronic device, a content upload rule that indicates whether sharing the content of the first mobile electronic device is allowed only using the direct wireless connection or using both the direct wireless connection and the connection between the server and the second mobile electronic device.

6. The method of claim 1 further comprising, the server:
receiving the content from the first mobile electronic device;
communicating some of the content to the second mobile electronic device
at least one of before the direct wireless connection is established or upon a loss of the direct wireless connection.

7. The method of claim 1 further comprising the server declining the first content-discovery request when the location indicates that the second mobile electronic device is outside of the established content-sharing geographical area.

8. A method performed by a first mobile electronic device to share content with another mobile electronic device, the method comprising:
communicating, to a server, a content-sharing request, credentials for establishing a direct wireless connection with the first mobile electronic device for sharing content of the first mobile electronic device, and a content upload rule indicating whether sharing the content of the first mobile electronic device is allowed only using the direct wireless connection or using both the direct wireless connection and a connection between the server and a second mobile electronic device; and
receiving, from the second mobile electronic device within an established content-sharing geographical area, a connection request that includes at least some of the credentials communicated to the server and, responsively, establishing the direct wireless connection with the second mobile electronic device.

9. The method of claim 8 further comprising the first mobile electronic device communicating the content-sharing request to the server in response to detecting a content-sharing gesture on a user interface of the first mobile electronic device.

10. The method of claim 8 further comprising the first mobile electronic device providing the content to the server.

11. The method of claim 10, wherein the content upload rule further indicates that sharing the content using the server is always allowed, wherein the content is provided to the server prior to establishing the direct wireless connection with the second mobile electronic device.

12. The method of claim 10, wherein the content upload rule further indicates that sharing the content using the server is allowed on-demand, wherein the content is provided to the server in response to a request for the content.

13. The method of claim 8, wherein the direct wireless connection is a Wi-Fi Direct wireless connection, and the method further comprises the first mobile electronic device performing a group owner role for the Wi-Fi Direct wireless connection.

14. The method of claim 13 further comprising the first mobile electronic device bypassing a Wi-Fi Direct discovery process when establishing the Wi-Fi Direct wireless connection using the credentials communicated to the server.

15. The method of claim 8 further comprising the first mobile electronic device communicating only a first part of the content using the direct wireless connection, wherein a second part of the content is communicated to the second mobile electronic device by the server at least one of before the direct wireless connection is established or upon a loss of the direct wireless connection.

16. A second mobile electronic device comprising:
a communication interface and a processor operatively coupled and cooperatively configured to:
communicate, to a server, a content-discovery request for content of a first mobile electronic device;
receive, from the server when a location of the second mobile electronic device is within an established content-sharing geographical area, a response that includes credentials for establishing a direct wireless connection with the first mobile electronic device;
communicate a connection request to the first mobile electronic device to establish the direct wireless connection using the credentials received from the server; and
receive, from the server, an indication of whether sharing the content of the first mobile electronic device is allowed only using the direct wireless connection or using both the direct wireless connection and a connection between the server and the second mobile electronic device.

17. The second mobile electronic device of claim 16, wherein the indication notifies the second mobile electronic device of whether sharing the content of the first mobile electronic device using the server is always allowed or is allowed on-demand.

18. The second mobile electronic device of claim 16, wherein the communication interface and the processor are further cooperatively configured to:
request and receive, from the server, a first portion of the content of the first mobile electronic device before the direct wireless connection is established; and
request and receive a second portion of the content of the first mobile electronic device using the direct wireless connection.

19. The second mobile electronic device of claim 16, wherein the communication interface and the processor are further cooperatively configured to:
request and receive a first portion of the content of the first mobile electronic device using the direct wireless connection;
request and receive, from the server, a second portion of the content of the first mobile electronic device after a loss of the direct wireless connection.

20. The second mobile electronic device of claim 16, further comprising the second mobile electronic device receiving the response that includes credentials for establishing a direct wireless connection with the first mobile electronic device from the server in response to sending a content-receiving gesture on the communication interface of the second mobile electronic device.

* * * * *